Sept. 27, 1960

L. TIGERMAN 2,953,911

DRIVE COUPLING

Filed Jan. 17, 1958

INVENTOR.
LOUIS TIGERMAN
BY John W. Michael
ATTORNEY

Sept. 27, 1960     L. TIGERMAN     2,953,911
DRIVE COUPLING

Filed Jan. 17, 1958     2 Sheets-Sheet 2

INVENTOR.
LOUIS TIGERMAN
BY John W. Michael
ATTORNEY

United States Patent Office 2,953,911
Patented Sept. 27, 1960

2,953,911

DRIVE COUPLING

Louis Tigerman, Milwaukee, Wis., assignor, by mesne assignments, to Western Leather Company, Milwaukee, Wis., a corporation of Wisconsin Filed Jan. 17, 1958, Ser. No. 709,612

1 Claim. (Cl. 64—30)

This invention relates to drive couplings of the type wherein motion is transmitted between opposing faces of a driving and driven member by frictional engagement therebetween.

With couplings of this type the initial friction at the faces often causes the driven member to be jerked to a start with consequent excessive wear and frequent failure of the coupling and associated equipment.

It is the object of this invention, therefore, to provide a simple and effective means for producing temporary slippage at the faces upon starting to bring the speed of the driven member gradually up to the speed of the driving member and to thereafter provide a direct frictional drive between the faces.

The device includes rotating driving and driven members having cooperating faces for transmitting motion therebetween. Slippage is produced at the faces upon starting by oil which flows to and forms a film on such faces through a passageway from a chamber in one of the members when the device is stationary. The passageway communicates with the inner radial end of the chamber so that when the members are rotated the reserve supply of oil will be held in the outer radial end of the chamber by centrifugal force to thereby prevent flow to the faces. The hydraulic transmission start caused by the lubricating effect of the film oil at the faces is gradually dissipated by heat and then a direct frictional drive smoothly becomes effective between the parts. The driven member, therefore, is brought up to speed without jerking and is thereafter driven by actual surface to surface contact of the faces.

Other objects and advantages will be apparent from the following description of one embodiment of the invention, as illustrated in the drawings, in which.

Figure 1:
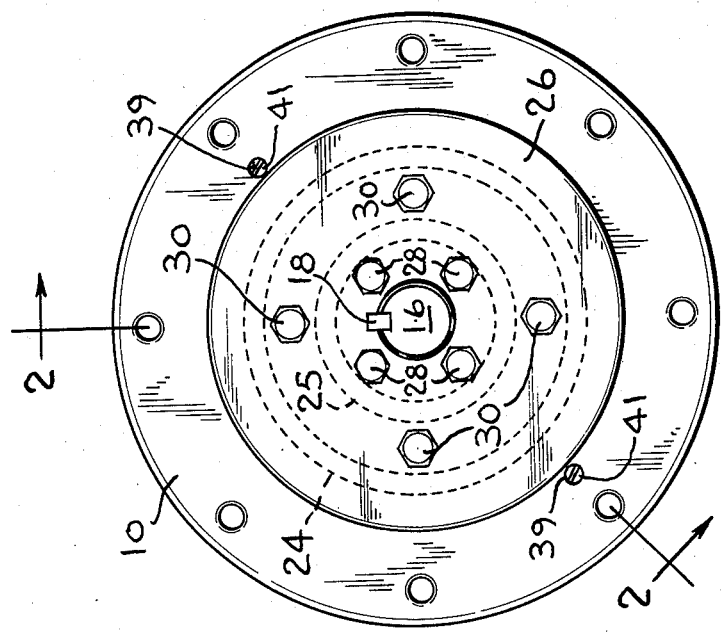
Fig. 1 is an end view of a coupling embodying the invention.
Figure 2:
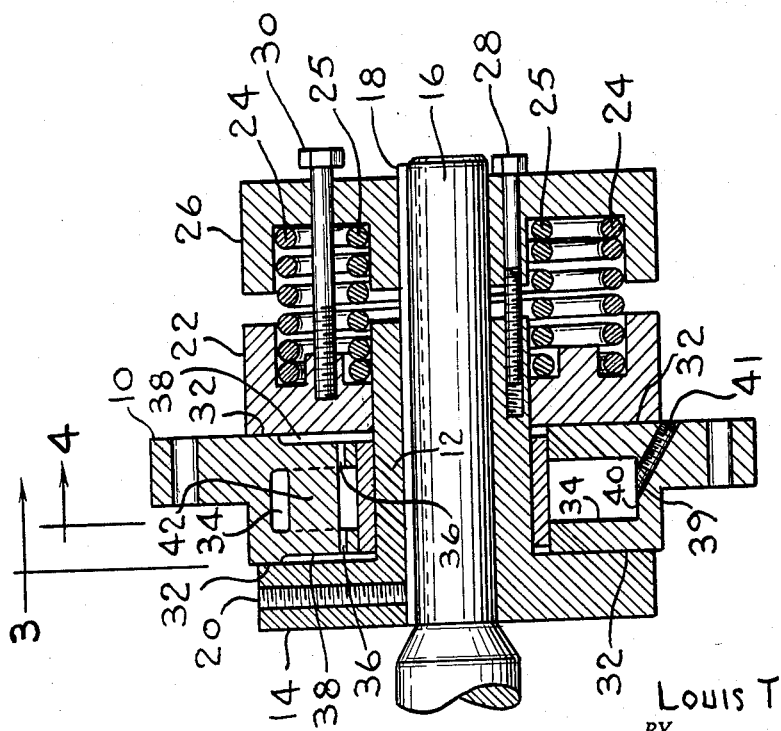
Fig. 2 is a sectional view taken along line 2—2 of Fig. 1.

A driven plate member 10 (which may be a sprocket or a mounting for a sprocket or the like) is slidably mounted on a hub 12 of a driving plate member 14 keyed to a drive shaft 16 by a key 18 held in position by a set screw 20. Driven plate 10 is urged against one face of driving plate member 14 by a pressure plate 22 slidably mounted on hub 12 and biased axially by concentrically arranged springs 24 and 25 acting between the pressure plate and an end plate 26. End plate 26 is keyed to shaft 16 by key 18 and fastened to the end of hub 12 by machine screws 28.

Pressure plate 22 is held for rotation with driving plate member 14 and end plate 26 by machine screws 30. Screws 30 are of sufficient length to permit axial sliding of the pressure plate on hub 12 to hold driven plate 10 in frictional engagement between driving plate 14 and pressure plate 22 by the force exerted by springs 24 and 25. The spring force acting on pressure plate 22 is adjustable by means of screws 28.

With the drive coupling thus far described, the starting friction at opposite faces 32 of driven plate 10 is high due to the direct surface to surface contact with driving plate 14 and pressure plate 22 causing the driven plate to be jerked to a start. This is avoided by a hydraulic transmission means operable to produce temporary slippage at faces 32 upon starting to gradually accelerate driven plate 10 without jerking. This means includes a chamber 34 in driving member 10 containing a suitable liquid 35 such as lubricating oil. Chamber 34 extends radially from the central portion of driven member 10 and communicates with opposite faces 32 of such member through passageways 36 leading from the inner radial portion of the chamber to radial grooves 38 in faces 32.

Figure 4:
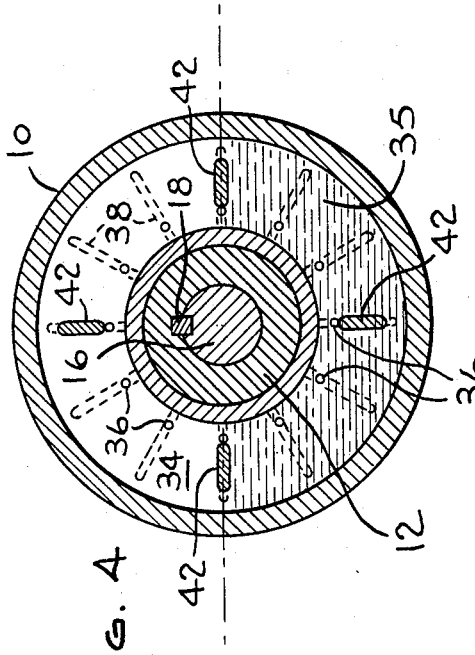
Fig. 4 is a sectional view taken along line 4—4 of Fig. 2 with the parts stationary.
Figure 5:
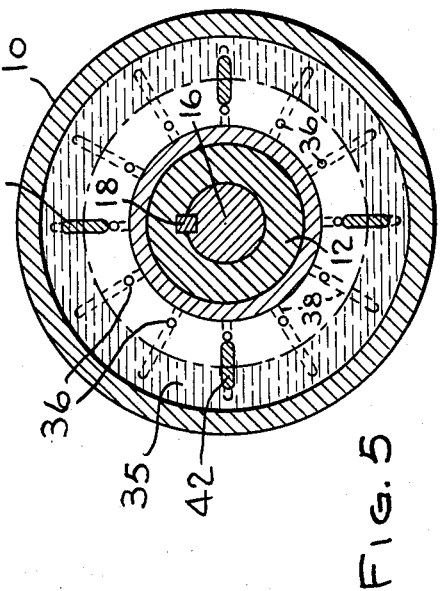
Fig. 5 is a view similar to Fig. 4 but with the parts rotating.
Figure 3:
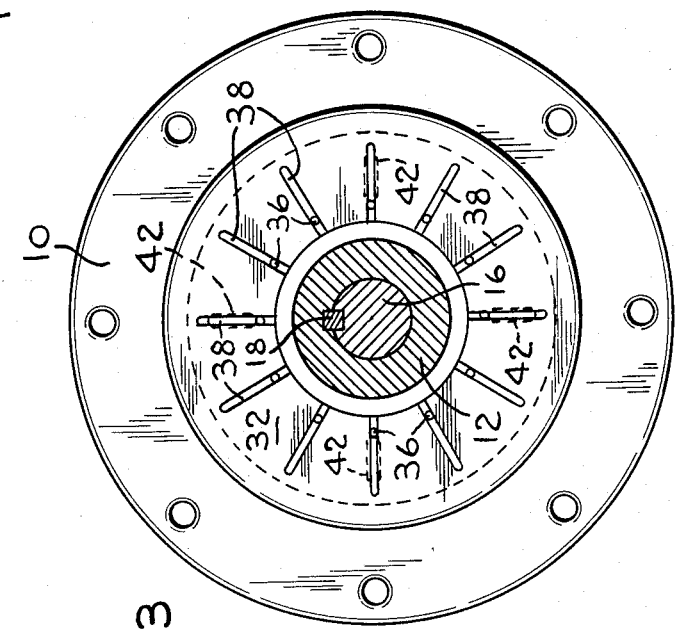
Fig. 3 is a sectional view taken along line 3—3 of Fig. 2.

The chamber is partially filled with oil to approximately half its capacity by means of diametrically opposed fill openings 39 in driven member 10. To fill, plugs 41 are removed and oil added with openings 39 lying horizontal to indicate when the chamber is half full. In the stationary position shown (Fig. 4), oil flows from chamber 34 to grooves 38 in the lower half of faces 32 through passageways 36 lying below the oil level in the chamber. Upon starting the oil in the grooves will be distributed over the faces 32 causing slippage thereat. As driven chamber is gradually brought up to speed, the oil in chamber 34 will be held against the outer radial wall 40 of the chamber away from passageways 36 by centrifugal force (Fig. 5). Oil flow to faces 32 is thereby shut off and no flow will occur as long as driven member 10 continues to rotate. Baffles 42 in chamber 34 aid in distributing the oil against the outer radial wall 40 of the chamber when driven member 10 is rotated.

The slippage at the faces will gradually diminish as the oil on the faces loses its lubricating properties due to the heat generated. Thereafter motion is transmitted by a positive drive with the members in direct surface to surface contact. This means there will be a smooth start with a gradual acceleration of the driven member up to running speed. When the device is stopped oil will again flow to the faces to provide the desired slippage when the drive shaft is started again.

The duration of slippage at the faces can be varied by adjustment of the force acting on pressure plate 22 by means of screws 28. The greater the force the lesser the duration of slippage. The lubricating properties of the oil film on the faces will dissipate sooner causing the hydraulic transmission start to become a direct frictional drive.

The drive coupling shown and described is just one of many types in which this invention could be embodied. The invention, for example, could be embodied in a very simple coupling having driving and driven members mounted at the ends of axially aligned shafts in face to face frictional engagement. Similarly, the oil chamber can be located in either the driving or driven member depending on the particular coupling arrangement involved.

Although but one embodiment of the present invention has been illustrated and described, it will be apparent to those skilled in the art that various changes and modifications may be made therein without departing from the spirit of the invention or from the scope of the appended claim.

I claim:

A device of the character described comprising, a rotatable driving plate having a hub, a pressure plate mounted on said hub for axial movement relative thereto, a driven plate freely mounted on said hub between said driving and pressure plates, means biasing said pressure plate toward said driving plate, a radially extending chamber in said driven plate, oil partially filling said chamber, a plurality of passageways leading from the inner radial portion of said chamber to the faces of said driven plate so that when said driven plate is stationary oil will flow to said faces to produce temporary slippage at said faces upon starting, said oil in said chamber being held in the outer radial portion of said chamber by centrifugal force when said driven plate is rotated to thereby prevent flow of oil to said faces and thereby permit direct surface to surface driving contact at said faces when the lubricating properties of the oil at the faces is dissipated.

References Cited in the file of this patent

FOREIGN PATENTS

| | | |
|---|---|---|
| 101,918 | Great Britain | Nov. 2, 1916 |
| 364,988 | Great Britain | Jan. 14, 1932 |
| 534,161 | Germany | Sept. 23, 1931 |